FIG. I.

INVENTOR.
FREDERICK A. WILHELM JR.
ELLIOT NESTLE
BY Allan Ratner
ATTORNEY

Jan. 13, 1970    F. A. WILHELM, JR., ET AL    3,489,888
FLOATING POINT LOOK-AHEAD BINARY MULTIPLICATION SYSTEM
UTILIZING TWO'S COMPLEMENT NOTATION FOR
REPRESENTING NEGATIVE NUMBERS
Filed June 29, 1966                       11 Sheets-Sheet 10

| | CELL (n) 12a | CELL (n-1) 12b | ONE CELL 38 | COMPLEMENT CELL 30 | SIGN CELL 12c |
|---|---|---|---|---|---|
| TABLE 1 SHIFT RIGHT ONCE | 0 | 1 | 0 | 0 | — |
| | 0 | 1 | 1 | 1 | 1 |
| | 1 | 0 | 0 | 1 | 1 |

| | 12a | 12b | 38 | 30 | 12c |
|---|---|---|---|---|---|
| TABLE 2 SHIFT RIGHT TWICE | 1 | 1 | — | — | — |
| | 0 | 0 | — | — | — |
| | 1 | 0 | 0 | 0 | 1 |
| | 1 | 0 | 1 | 1 | 1 |
| | 0 | 1 | 0 | 1 | 1 |

| | | | | | |
|---|---|---|---|---|---|
| TABLE 3 SUBTRACT | 0 | 1 | 0 | 1 | 1 |
| | 1 | 1 | 0 | 0 | — |
| | 1 | 1 | 1 | 1 | 1 |
| | | | | | |

| | | | | | |
|---|---|---|---|---|---|
| TABLE 4 ADD | 0 | 0 | 0 | 1 | 1 |
| | 1 | 0 | 0 | 0 | — |
| | 1 | 0 | 1 | 1 | 1 |
| | | | | | |

(—) IS DEFINED AS "DON'T CARE" OR NOT RELEVANT

FIG. 9.

INVENTOR.
FREDERICK A. WILHELM JR.
BY ELLIOT NESTLE
Allan Ratner
ATTORNEY

| BITS | | PLIER POS. $Q(o)^*$ & ONE$^*$ | PLIER POS. $Q(o)^*$ & ONE | PLIER NEG. ONE$^*$, TWC.$^*$ | PLIER NEG. $Q(0)$ ONE$^*$, TWC. | PLIER NEG. $Q(0)$ ONE, TWC. |
|---|---|---|---|---|---|---|
| $Q(n-1)$ | $Q(n)$ | | | | | |
| 0 | 0 | SHR 2 | ADD & SHR 2 RESET ONE | SHR 2 | ADD & SHR 2 SET ONE | SHR 2 |
| 0 | 1 | ADD & SHR2 | SHR 1 | ADD & SHR 2 SET ONE SET TWC. | SHR 1 | ADD & SHR2 |
| 1 | 0 | SHR 1 | SUB & SHR 2 | SHR 1 | SUB & SHR 2 | SHR 1 |
| 1 | 1 | SUB & SHR 2 SET ONE | SHR 2 | SUB & SHR 2 SET TWC. | SHR 2 | SUB & SHR 2 RESET ONE |

SHR 2 = SHIFT RIGHT TWICE
SHR 1 = SHIFT RIGHT ONCE

FIG. 10

United States Patent Office 3,489,888
Patented Jan. 13, 1970

3,489,888
FLOATING POINT LOOK-AHEAD BINARY MULTI-PLICATION SYSTEM UTILIZING TWO'S COMPLEMENT NOTATION FOR REPRESENTING NEGATIVE NUMBERS
Frederick A. Wilhelm, Jr., Eatontown, and Elliot Nestle, Neptune, N.J., assignors to Electronic Associates, Inc., Long Branch, N.J., a corporation of New Jersey
Filed June 29, 1966, Ser. No. 561,575
Int. Cl. G06f 7/38
U.S. Cl. 235—164       12 Claims

ABSTRACT OF THE DISCLOSURE

A floating point two bit look-ahead binary multiplication system using two's complement notation for representing negative numbers is disclosed by providing an accumulator, a Q register, an operand register, a summer and multiply control circuitry. The control circuitry generates signals indicative of the proper action to be taken by the multiplication system. Any one of four operations may be performed; shift right twice; add and shift right twice; subtract and shift right twice; and shift right once. By proper choice of these operations corrections for a negative multiplier is accomplished resulting in a correct product.

---

This invention relates to a two's complement multiplication system for a digital computer and more particularly to a floating point multiplication system utilizing two bit look-ahead circuitry.

Two's complement floating point multiplications systems for digital computers are known in the art. In many such systems the time for multiplication may be substantially reduced by looking at more than one bit of the multiplier or multiplicand at one time. In this manner multi-bit look ahead has been used to achieve rapid multiplication. In such multiplication positive numbers or negative numbers or any combination thereof may be multiplied together to produce an algebraic product. However, prior multiplication systems using negative numbers required complex control circuits as a result of inherent ambiguities. These ambiguities arise because the algorithm used in two's complement multiplication is required to differentiate in the multiplier bits between a magnitude "0" or a magnitude "1." Without a past knowledge of data it is impossible to determine the magnitude of a given bit of a two's complement string.

Some prior multiplication systems have converted all negative multipliers to their positive equivalents thereby effectively circumventing the above problem. However such prior systems have required "fix-up" cycles at the end of the multiplication to provide correction and this has resulted in a substantial increase in the multiplication time. Other prior multiplying systems have effectively complemented the binary information applied to multiplying control circuitry which required a substantially larger amount of logic circuitry.

Accordingly an object of the present invention is a two's complement multiplication system which when operating upon negative multipliers does not require any physical complementing of the multiplier.

Another object of the present invention is a two's complement multiplication system which does not require any effective complementing of the binary information applied to the multiply control circuitry.

In accordance with the present invention there is provided two's complement multiplication system for a digital computer having an accumulator, a Q register, an operand register, a summer and multiply control circuitry. The signals indicating the action to be taken by the multiplication system are generated by the multiply control circuitry. The decisions of the control circuitry are modified to correct for the singularities of the negative multipliers. Specifically, any one of four operations may be performed, e.g. shift right twice, add and shift right twice, subtract and shift right twice and shift right once. By proper choice of any one of these operations, corrections for any negative multiplier will result in a correct product.

In this manner substantially less circuitry is required to perform the desired multiplication as compared with prior multiplication systems which effectively complemented the binary information applied to the control circuitry. In addition the system according to the invention provides substantially more rapid multiplication than the prior systems which physically complemented the multiplication.

For further objects and advantages of the invention and for a more detailed discussion of its component parts and the manner of operation, reference is to be had to the following description taken in conjunction with the accompanying drawings in which.

Figure 5A:
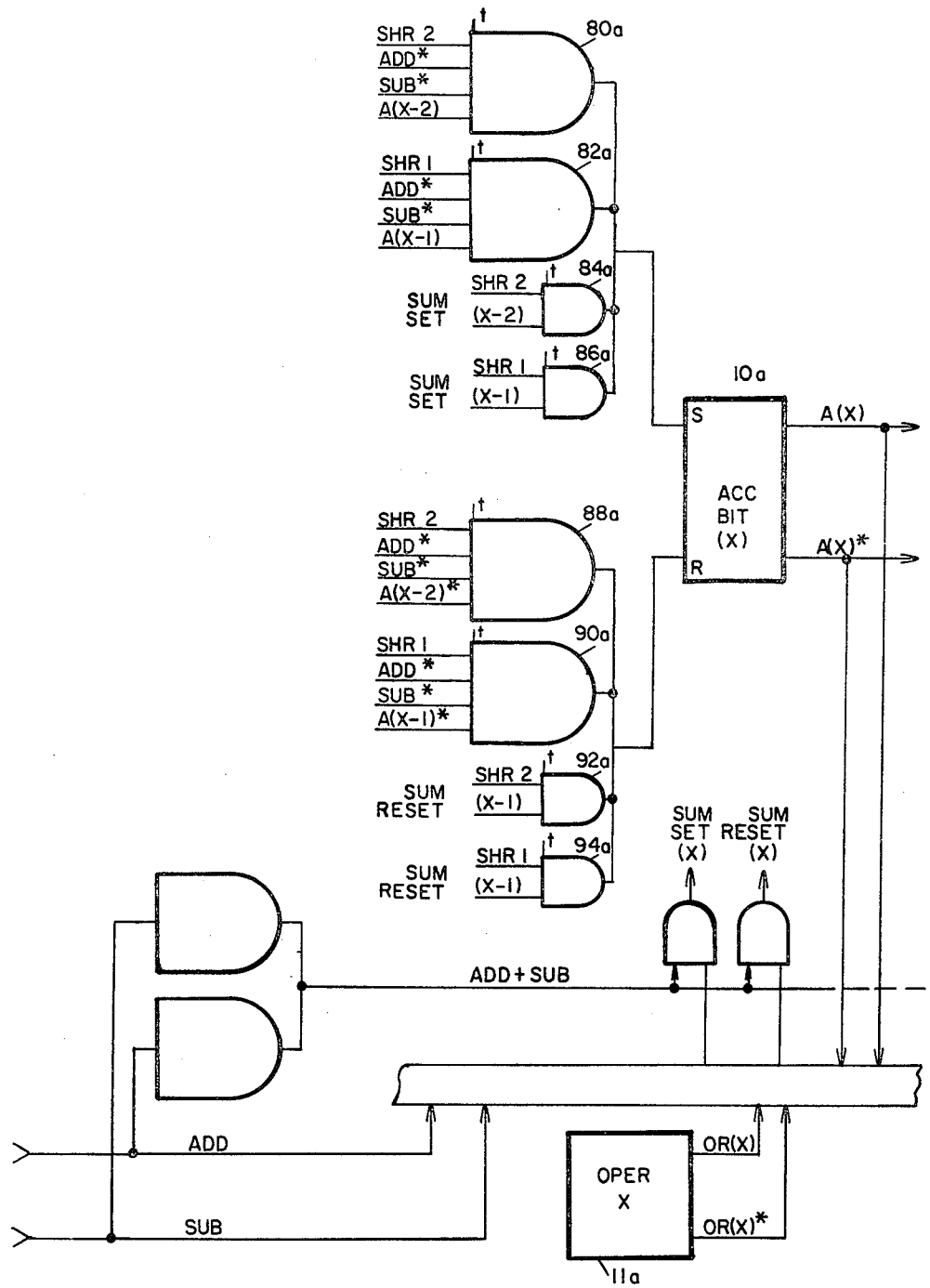
Figure 5B:
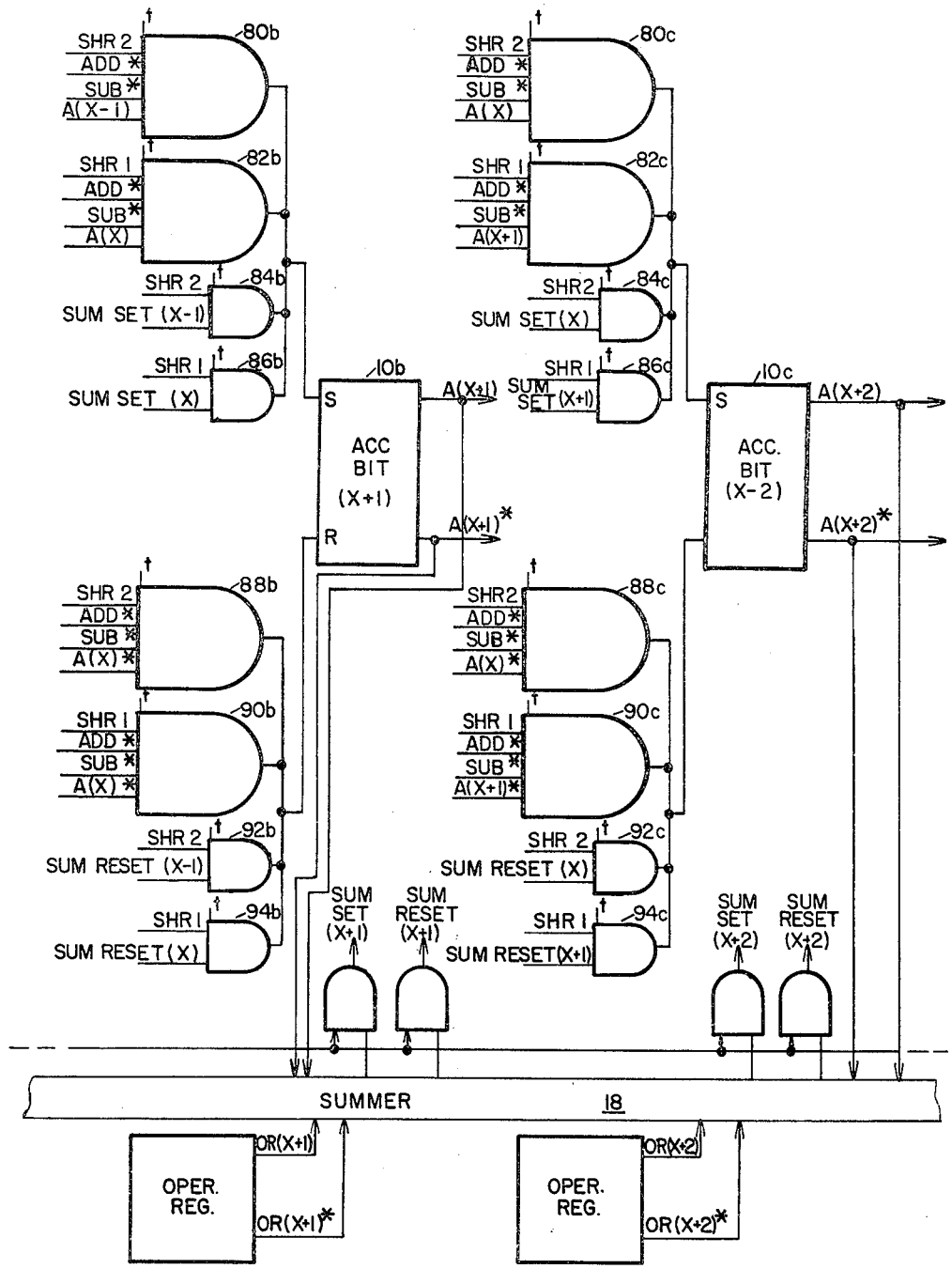
Figure 6:
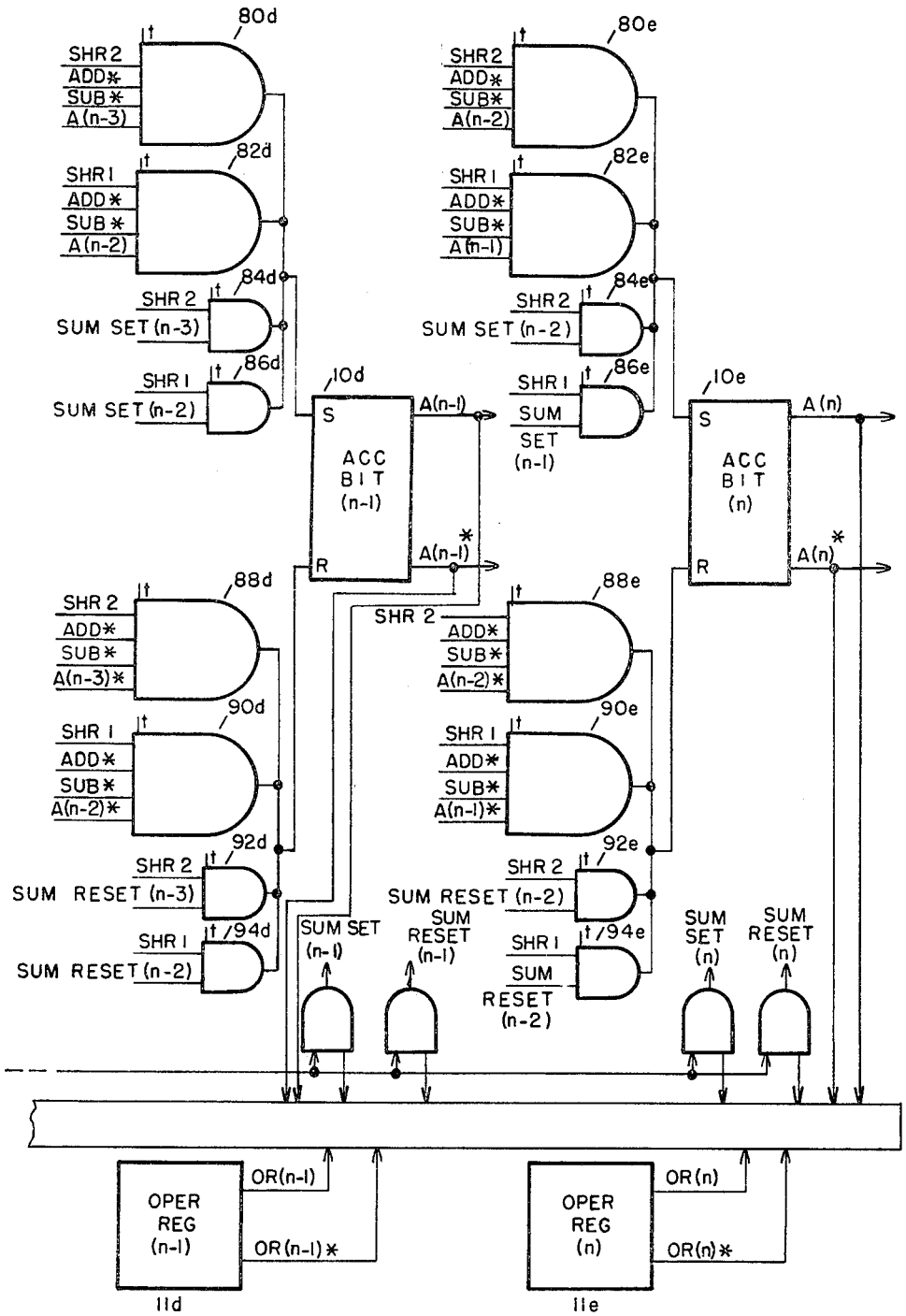
Figure 7:
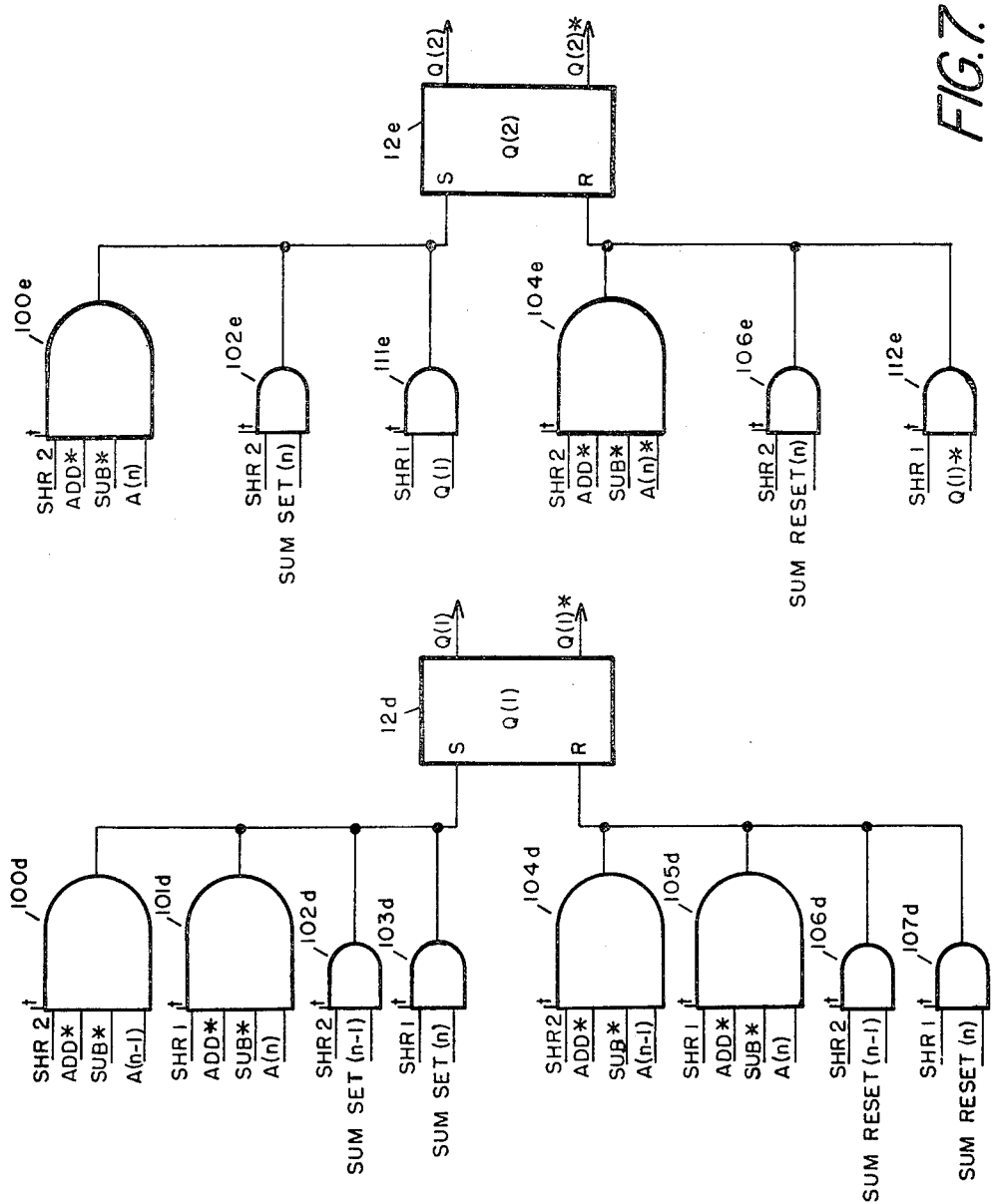
Figure 8:
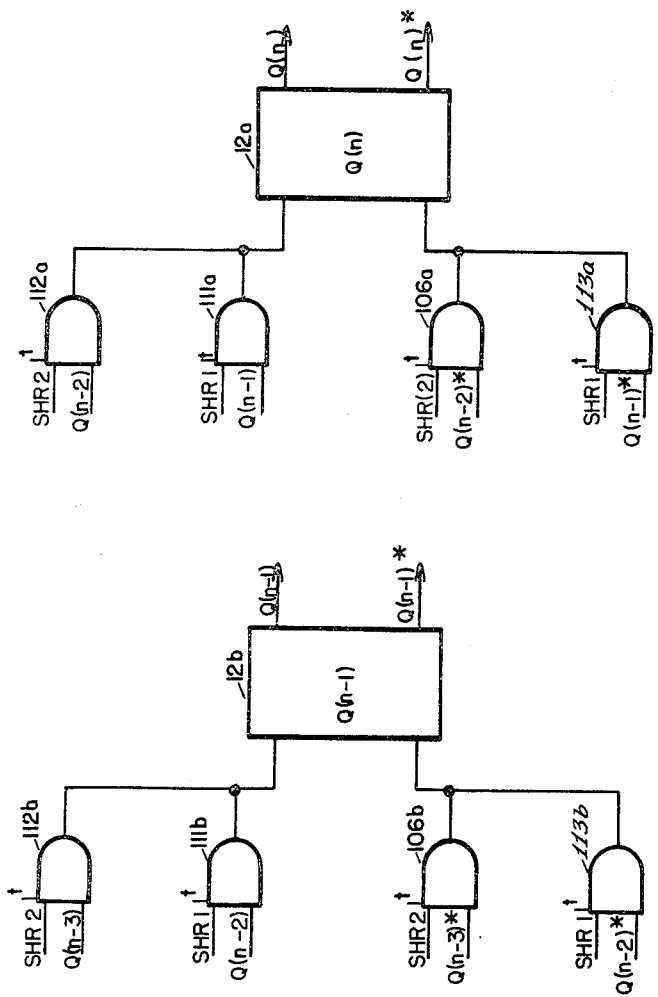

FIGS. 5A, 5B and 6 taken together are block diagrams of a representative portion of the accumulator;

FIGS. 7 and 8 taken together are block diagrams of a representative portion of the Q register; and FIGS. 9 and 10 are tables to show the operation of the gates of FIGS. 2–8.

Figure 1:
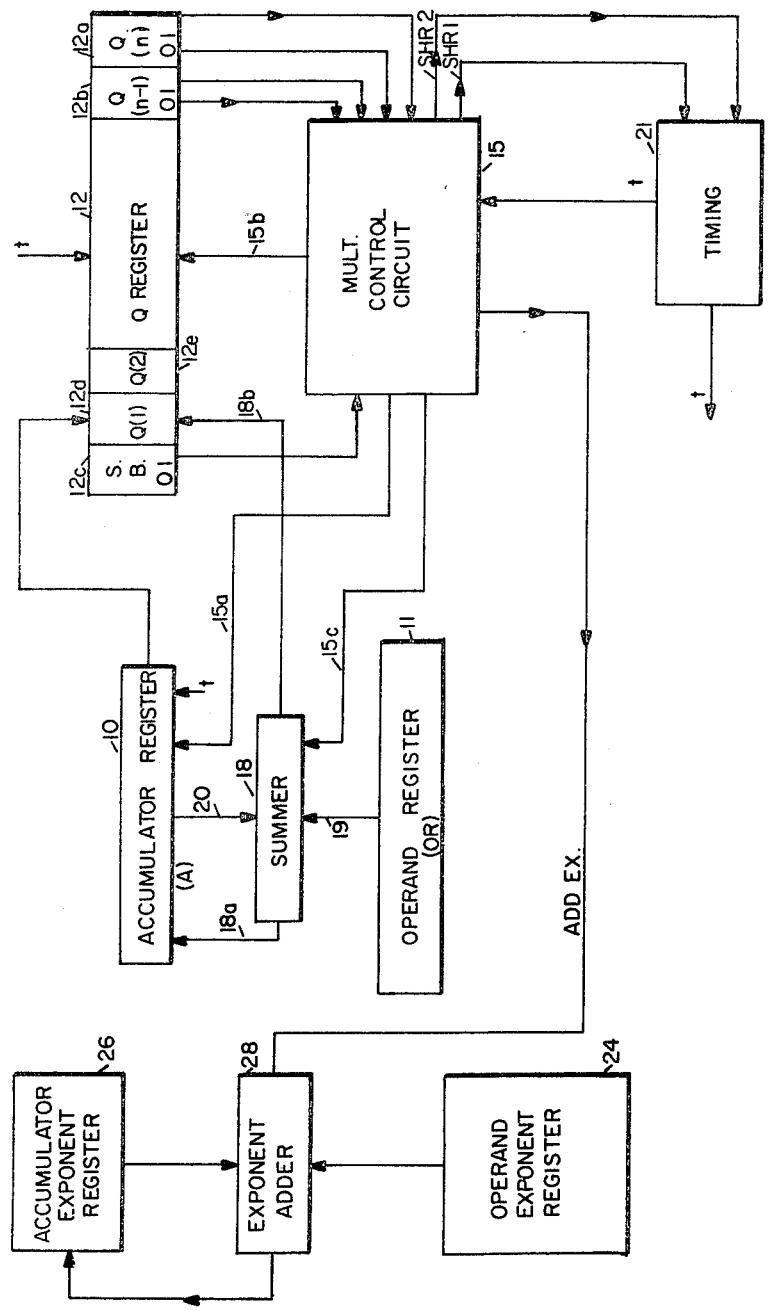
FIG. 1 is a block diagram of a multiplying system illustrating the invention.

Referring now to FIG. 1, there is shown a multiplication system for positive and negative floating point numbers comprising a signed mantissa and a signed exponent.

GENERAL DESCRIPTION

The multiplication system includes an accumulator register 10 in which the most significant half of the product will reside after the multiplication is completed. In addition, register 10 operates as a working register storing and manipulating the partial product. Further, an operand register 11 and a Q register 12 are provided. Registers 10–12 each include a plurality of binary cells each of one binary digit capacity. The number of cells in each of the registers 10–12 are equal and in a specific embodiment may be equal to twenty-three cells plus a sign cell.

In this description in binary terminology a 1-state corresponds to a logic high and a 0-state corresponds to a logic low. The complement notation (*) will be used, e.g. ADD*. In addition the following is a partial list of terms that are used in the description:

String—two or more successive cells
Sum—algebraic addition or subtraction between the accumulator register 10 and operand register 11.

The multiplier initially resides in the Q register 12 with the least significant cell indicated in FIG. 1 as cell $n$ (12a) and the next most significant cell as cell $n-1$ (12b). The outputs of cells $n$ and $n-1$ together with the most significant cell 12c of the Q register are applied as inputs to a multiply control circuit 15. On the basis of these inputs, circuit 15 generates control signals which are applied by way of conductors 15a to register 10, conductors 15b to register 12 and conductors 15c to a summer 18. Summer 18 has applied thereto inputs from register 11 by way of conductors 19 and inputs from register 10 by way of conductors 20. Summer 18, based on the inputs received from registers 10 and 11 and circuit 15, generates signals which represent the algebraic sum or difference of registers 10 and 11 and applies these signals to register 10 by way of conductor 18a and to a part of register 12 by way of conductor 18b.

The multiplicand resides in operand register 11. Depending on the state of cells n and n—1 and the sign cell of the Q register 12, control circuit 15 develops any one or combination of the following signals to operate the summer 18 and/or gates in register 10 and register 12. Specifically, these signals indicate:

shift right twice (SHR 2)
shift right once (SHR 1)
add (ADD)
subtract (SUB).
and the complements of each of the above signals.

The foregoing basic multiplication system is described in the literature, as for example in the text by Ivan Flores, The Logic of Computer Arithmetic, Prentice-Hall, 1963 at page 193 et seq. As described in the text, on the basis of the state of cells $n$ and $n-1$ the signal from circuit 15 causes a partial product to be developed in register 10 and part of register 12. The partial product is a function of the contents of registers 10 and 11 and cells $n$ and $n-1$ and the sign cell of register 12. In forming the first partial product the contents of the information state of register 10 is shifted right once or twice. Thus the information from the least significant cell or cells shifts into the most significant cell of Q register 12. Similarly, the contents of the information states of Q register 12 is shifted once or twice. The shifting of registers 10 and 12 is dependent on the output of control circuit 15, later to be described in detail.

As a result of this shifting of the contents of cells $n$ and $n-1$ (12a, 12b), the contents of these cells may change and the new contents represent the next multiplier bits to be applied to or "scanned" by circuit 15. In similar manner, a second partial product will be formed and the multiplier in the Q register 12 is again shifted to scan successive bits.

When the complete multiplier, formerly residing in Q register 12, has been scanned the partial product now residing in accumulator register 10 and all of register 12 represents the complete product. The most significant half of that complete product will reside in register 10 and the least significant part in register 12. There has now been described the generation of the mantissa of the product. In addition, the exponents must be added to produce the correct exponent of the product. Specifically, the exponent of the multiplicand resides in operand exponent register 24 and the exponent of the multiplier resides in the accumulator exponent register 26. These two exponents are added by exponent adder 28, with the resultant sum being stored in register 26.

The operation of control circuit 15 and the manner in which it manipulates positive multipliers in the multiplier system is well known in the art and is described for example in the above cited text at page 201 et seq. In accordance with the invention, circuit 15 manipulates negative multipliers to produce multiplication in which there is achieved a good balance between cost of the associated circuitry and the speed of multiplication.

MULTIPLY CONTROL CIRCUIT FOR MANIPULATION OF NEGATIVE MULTIPLIERS

Figure 2:
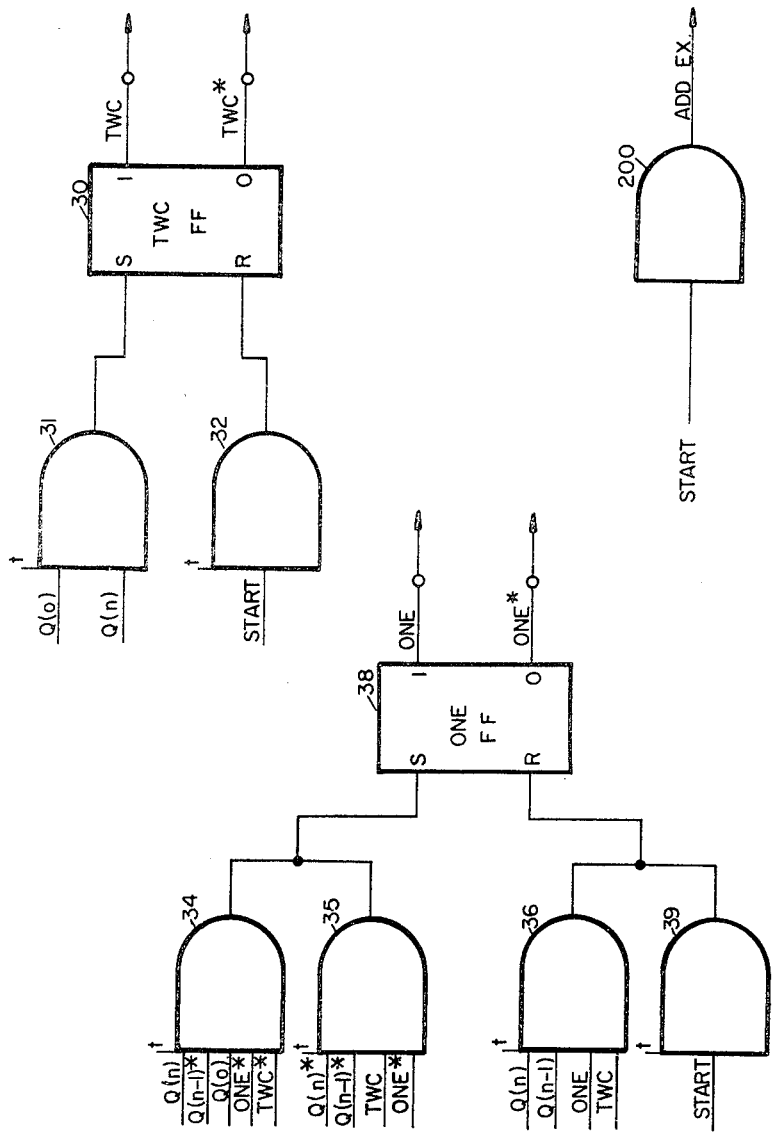
FIGS. 2 and 3 are block diagrams of control circuit gates.
Figure 3:
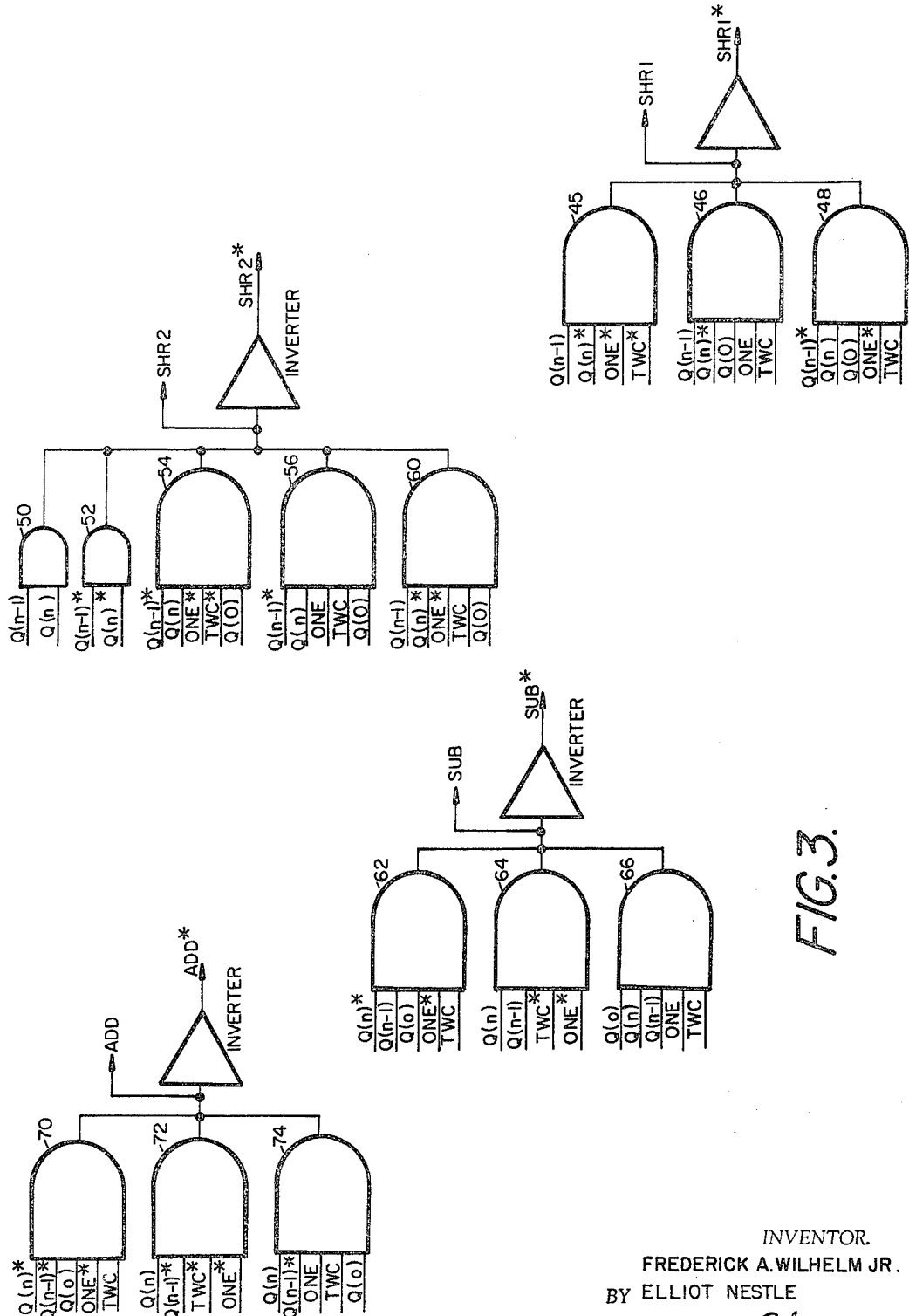

The multiply control circuit 15 of FIG. 1 comprises the gating circuits of FIGS. 2 and 3. In FIG. 2 there is shown a complement flip-flop (TWC) 30 of the type well known in the art, having a set and a reset input and a 1-side and a 0-side output. Hereinafter flip-flops or binary cells may be any one of the well known types having two stable states in which, in its 1-state, the 1-side is high and the 0-side is low.

The set input of flip-flop 30 is connected to an output of an AND gate 31 to which there is applied the 1-side output of cell $n$ (12a) and sign cell 0 (12c) of the Q register 12. In addition a timing pulse $t$, later to be described in detail, is also applied to gate 31. Thus cell 30 is set to its 1-state when cell $n$ and the sign cell are high and a timing pulse is applied all in coincidence. It will be understood that cell 30 is initially reset by a start signal in coincidence with a timing pulse, both applied to AND gate 32, the output of which is connected to the reset terminal of cell 30.

It will be understood that for the purpose of this description only negative multipliers are involved so that the sign cell 12c of register 12 is always in a 1-state. Thus when gate 31 is enabled by signal Q(n), this indicates a 1-state of the multiplier resides in cell $n$ of register 12. At the time of the timing pulse, with all inputs high, gate 31 applies a pulse to set cell 30 in its 1-state. This indicates that the absolute magnitude of the remaining multiplier is the two's complement of the states of the binary cells of the remaining bits in the multiplier then residing in register 12.

Flip-flop or binary cell 38 is defined as the "one" flip-flop and is initially reset by a start signal in coincidence with a timing pulse both of which are applied to AND gate 39 connected to the reset terminal of flip-flop 38. The output of AND gate 36 is also connected to the reset terminal and has as its inputs the 1-sides of cells 12a and 12b, cell 38, and cell 30. AND gates 34 and 35 have outputs connected to the set terminal of flip-flop 38. The inputs of gate 34 are the 1-sides of cells 12a and 12c and the 0-sides of cells 12b, 38, and 30. In addition the inputs of gate 35 are the 0-sides of cells 12a, 12b, 38 and the 1-side of flip-flop 30. The one flip-flop or binary cell 38 signifies that a string of ones in cells $n$ and $n-1$ (12a, 12b) are in the process of being scanned. A string of ones may be defined as a string (two or more) of 0-states passing through cells 12a and 12b if a 1-state in these cells has previously been recognized (gate 35). Flip-flop 30 operates as a "history" of the 1-states passing through cells 12a which causes it to switch to the 1-state. In addition a string of ones is defined as a 1-state passing through cell 12a and a 0-state passing through gate 12b if a 1-state in these cells has not previously been recognized (gate 34). That is, flip-flop 30 has not been set to a 1-state.

AND gate 36 operates to reset flip-flop 38 when a string of ones is no longer recognized (or scanned). Thus, flip-flop 38 is set when a string of ones is recognized by gates 34 and 35 or reset when a string of ones has been terminated.

Referring now to FIG. 3, there is shown a generation of signals shift right twice (SHR 2) and shift right once (SHR 1). AND gates 45, 46, and 48 are associated with the SHR 1 signal and have their outputs connected together as a virtual OR to provide the SHR 1 output. Gate 45 has applied thereto the 1-sides of cell 12b and the 0-sides of cells 12a, 38 and 30. Gate 46 has applied thereto the 1-sides of cells 12b, 12c, 38, and 30 and the 0-side of cell 12a. Further, gate 48 has applied thereto the 1-sides of cells 12a, 12c and 30 and the 0-sides of cells 12b and 38. It will be understood by those skilled in the art that gates 45, 46 and 48 are defined by the truth table 1 illustrated in FIG. 9. Signal SHR 1 in conjunction with other signals later to be described causes either of (1) the information states of registers 10 and 12 to be shifted 1 position to the right in the direction of lesser magnitude, or (2) the output of summer 18 to gate its information to the proper gates of register 10 and the most significant bit of register 12. The choice of (1) or (2) depends on the signals ADD and SUB which will later be defined.

AND gates 50, 52, 54, 56 and 60 are associated with the signal SHR 2 and have their outputs connected together as a virtual OR to provide the SHR 2 output.

Gate 50 has applied thereto the 1-sides of cells 12a and 12b. Gate 52 has applied thereto the 0-sides of cells 12a and 12b. Gate 54 has applied thereto the 1-sides of cells 12a and 12c and the 0-sides of cells 12b, 38, and 30. Further, gate 56 has applied thereto the 1-sides of cells 12a, 38, 30, and 12c and the 0-side of cells 12b. In addition the gate 60 has applied thereto the 1-sides of cells 12b, 30, and 12c and the 0-sides of 12a and 38. Thus it will be understood that gates 50, 52, 54, 56, and 60 are defined by the truth table 2 illustrated in FIG. 9. The signal SHR 2 in conjunction with other signals causes either (1) the information states of registers 10 and 12 to be shifted two positions to the right in the direction of lesser magnitude or (2) the output of summer 18 to gate its information through the proper gates of register 10 and the two most significant bits of register 12. The choice of (1) or (2) depends on the signals ADD and SUB.

In FIG. 3 subtract signals (SUB) are generated by AND gates 62, 64, and 66 having their outputs connected together as a virtual OR to produce the SUB signal. Specifically, gate 62 has applied thereto the 1-sides of cells 12b, 30, and 12c, and the 0-sides of 12a and 38. Gate 64 has applied thereto the 1-sides of cells 12a and 12b and the 0-sides of cells 38 and 30. In addition gate 66 has applied thereto the 1-sides of cells 12a, 12b, 12c, 38, and 30. Accordingly, gates 62, 64, and 66 may be defined by the truth table 3 of FIG. 9. The subtract signal in conjunction with SHR 2 causes the summer 18, FIGS. 1 and 4, to develop signals sum set and sum reset which are applied to the proper cells of registers 10 and the two most significant cells of registers 12.

Signals ADD are generated by AND gates 70, 72 and 74 the outputs of which are connected together to produce the ADD signal. Specifically gate 70 has applied thereto the 1-sides of cells 12c and 30 and the 0-sides of cells 12a and 12b and 38. Gate 72 has applied thereto the 1-side of cell 12a and the 0-sides of 12b, 30, and 38. Gate 74 has applied thereto the 1-sides of cells 12a, 12c, 30, and 38 and the 0-side of cell 12b. Accordingly the gates 70, 72 and 74 may be defined by truth table 4 of FIG. 9. The ADD signal in conjunction with SHR 2 causes the summer 18, FIGS. 1 and 4, to develop the signals sum set and sum reset which are applied to the proper gates of register 10 and the two most significant bits of register 12. Gates 70, 72, and 74 are defined by table 4, FIG. 9.

OPERATING REGISTERS

The differing outputs of the circuits shown in FIGS. 2 and 3 comprising the multiply control circuit 15, FIG. 1, are applied to the operating registers illustrated in FIGS. 5–8. FIGS. 5 and 6 show the logic and binary cells or flip-flops of the accumulator register 10 and FIGS. 7 and 8 taken together show the logic flip-flops of the Q register 12. Only five binary cells have been illustrated for accumulator 10 and only four cells for Q register 12 though it will be understood that any number of cells may be provided. The only requirement is that there must be as many cells in each register as there are bits in the multiplier, as for example in one embodiment twenty-three bits.

FIG. 5 illustrates any general consecutive binary cells 10a–10c of register 10 and FIG. 6 illustrates the two least significant cells n and n−1 (10d, 10e respectively). FIG. 7 illustrates in the Q register 12 the two most significant bits 12d (most significant) and 12e (next most significant). In addition, FIG. 8 shows in the Q register the two least significant bits, cell n (12a) and cell n−1 (12b).

With regard to FIGS. 5 and 6 it will be understood that the corresponding elements of the different stages 10a–10e of accumulator 10 have been identified by the same reference character plus a suffix corresponding to that particular stage. Since all of the binary cells of accumulator 10 are similar, only one of them, cell or flip-flop 10c will be described in detail. Associated with cell 10c is logic circuitry having inputs identified by a corresponding mnemonic. This logic circuitry comprises (1) AND gates 80c, 82c, 84c, and 86c, the outputs of which are connected together and applied to the set side of flip-flop 10c and (2) AND gates 88c, 90c, 92c and 94c the outputs of which are connected together and applied to the reset side of that flip-flop. Accordingly, each of the four AND gates connected to the set side has a corresponding complementary term AND gate connect to the reset side. In this manner a selected binary cell of register 10 always takes a predetermined state for each applied timing pulse.

If circuit 15 generates high signals SHR 2, ADD*, and SUB* then gates 80c and 88c are partially enabled. Thus the command is to shift right twice and therefore the information state of a binary cell of the accumulator 10, two bits more significant than cell 10c, i.e. cell 10a, should be shifted into cell 10c. It will be noted that one of the inputs of gate 80c is the 1-side of cell 10a while one of the inputs of gate 88c is the 0-side of cell 10a. Accordingly, if the state of cell 10a is in a 1-state then gate 80c is totally enabled and gate 88c is disabled. Thus in coincidence with the timing pulse, cell 10c is set to its 1-state. It will here be noted that there is a gate equivalent to gates 80c and 88c associated with each of the cells 10a–10c as well as 12d, and 12e.

As a result of the signal SHR 2 the binary states of the registers 10 and 12 will have been effectively shifted right twice. The information state of the sign bit of accumulator 10 (not shown) will shift through the first to the second most significant cell of that register. However no information is shifted into the sign cell 12c.

In manner similar to that described above, if circuit 15 generates 1-state signals SHR 1, ADD* and SUB*, then gates 82c and 90c are partially enabled. These gates are effective to shift the information states of register 10 one position to the right in the direction of lesser significance. It will be noted that the 1-side of flip-flop 10b is connected to an input of gate 82c and the 0-side of flip-flop 10b is connected to an input of gate 90c. Therefore depending on the state of flip-flop 10b, either gate 82c or 90c will be totally enabled. Upon coincidence of a timing pulse cell 10c is set or reset in accordance with inputs to gates 82c or 90c.

Similar gates are provided for logic circuits associated with the cells of registers 10 and 12 which produce the complete shift. If circuit 15 produces (1) a 1-state SHR 2 and (2) a 1-state ADD or a 1-state SUB, then gates 84c and 92c will be partially enabled. It will be seen that a 1-state ADD or SUB are applied to summer 18 to develop a sum set and a sum reset signal, later to be described in detail. The summer 18 may produce a 1-state signal to be applied to the sum set input of gate 84c or a 1-state signal to be applied to the sum reset input of gate 92c. It will be understood that sum signals represent the information set of an algebraic addition or subtraction of the accumulator and operand bits two positions in the direction of greater significance, e.g. cells 10a and 11a.

In coincidence with a timing pulse, cell 10c assumes an information state corresponding to the algebraic sum of cells 10a and 11a. The shifted sum is applied to all of the cells of register 10 and to the two most significant cells of register 12, viz. cells 12d and 12e. The algebraic sum of the accumulator and operand sign bits (not shown) is shifted into the two most significant bits of accumulator 10. A description similar to the above is applicable to gates 86c and 94c, the only difference being that the algebraic sum is shifted only once in the direction of least significance.

Referring now to FIGS. 7 and 8, illustrating register 12, the most significant bit of that register, viz. cell 12d, includes logic similar to that of accumulator 10. The logic of cell 12e (the next most significant cell) is similar to the logic of cell 10c except that there is absent a gate corresponding to gate 86c and its complement gate 94c. The reason for this absence is that the action signal corresponding to gates 86c and 94c is a sum and shift once which will be generated only as far as cell 12d. Instead gates 111e and 112e are provided having as input signals SHR 1, and the 1-side and 0-side of cell 12d, respectively. Therefore in coincidence with the timing pulse, cell 12e copies the information state of cell 12d.

Cells 12d and 12e serve as an extension to accumulator 10. For example, when shifting right twice, the information state of cell 10d of the accumulator is shifted to cell 12d of the Q register. The state of cell 10e is shifted to cell 12e. Thus it will now be clear that the Q register cells of lesser significance than 12e, e.g. 12a and 12b, do not contain sum set and sum reset gates 84c and 86c, 92c and 94c since the sum can only be shifted twice and cannot extend into the cells of less significance than cell 12e of the Q register 12.

Cells 12a and 12b always copy the information states of the preceding cell for the SHR 1 command and will copy the information states of a cell two bit positions more significant for an SHR 2 command. During multiplication it will be understood that either of the signals SHR 1 or SHR 2 must be high. For example, the SHR 1 signal is applied to gates 111a and 113a and the 1-side of cell 12b is applied to gate 111a. In addition the 0-side of cell 12b is applied to gate 113a. Thus if signal SHR 1 and the 1-side of cell 12b are high, then cell 12a is set on a time pulse thereby copying the information state of cell 12b. There has now been explained the way in which the operating registers function to perform binary multiplication using a negative multiplier.

MACHINE TIMING

The timing system 21, as shown in FIG. 1, has applied thereto the signals SHR 1 and SHR 2 and produces the timing pulses $t$ which are applied to circuit 15 and registers 10–12. Timer 21 is shown in detail in FIG. 4 and comprises a source of clock pulses 150 and a down counter register 152 of the type well known in the art, as for example as described in the book, Digital Computer and Control Engineering by R. S. Ledley, McGraw-Hill Book Co., 1960 at page 488 et seq.

In operation of the timing system, signals SHR 1 and SHR 2 and a start signal (generated externally) are applied to the timer. Specifically, SHR 2 is applied to AND gate 154 the other input of which is the source of timing pulses $t$. In addition signal SHR 1 is applied to AND gate 156 in conjunction with the signals $t$. The outputs of gates 154 and 156 as well as the output of a gate 160 are applied as inputs to counter 152. It will be seen that the input to AND gate 160 is a start signal. The output of counter 152 is the timing pulse which is applied to registers 10–12 and circuit 15, for machine timing later to be described in relation to machine operation.

In particular operation of timer 21, signal SHR 2 in a 1-state in conjunction with a timing pulse $t$ causes counter 152 to decrement by two and generate a timing pulse $t(n)$ to the machine. Similarly SHR 1 in a 1-state in conjunction with a timing pulse $t$ causes counter 152 to decrement by one and generate a timing pulse $t(n)$. When counter 152 is completely reset to its initial state, the machine timing pulses $t(n)$ will be disabled.

SUMMER 18

Figure 4:
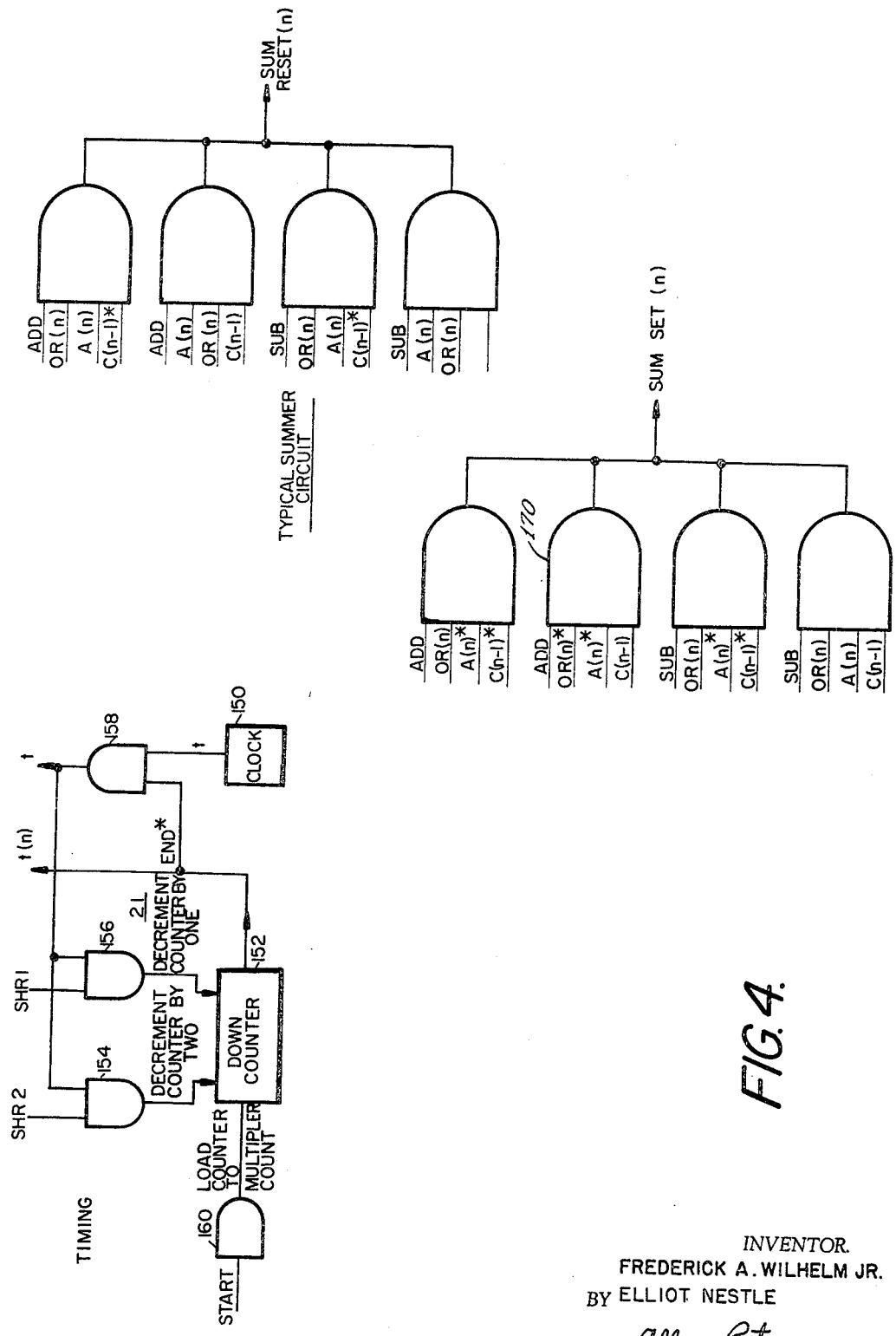
FIG. 4 is a block diagram of the summer and the timing system.

Summers used with multiplication systems are well known in the art and are set forth in the above cited Ledley text in Chapter 6. The known summers may be modified in the manner shown in FIG. 4 to provide a summer used in the present embodiment. Summer 18 produces either a signal sum set or sum reset which either sets or resets a desired cell of registers 10 or 12 as a function of the arithmetic instructions ADD, SUB, carries and operand content. For example, Q register cell 12e, FIGURE 7, is set by signal sum set $(n)$ if gate 170, FIGURE 4, is enabled by signals ADD, OR$(n)$*, A$(n)$* and carry C$(n-1)$. Generation of these carries are fully described in the cited Ledley text, Chapter 6. It will be understood that only the summer circuit for one bit position $(n)$ has been illustrated and there is provided a similar circuit for each of the remaining bit positions of the multiplication system of the present invention.

OPERATION OF SYSTEM

There will now be described a typical operation of the multiplication system using a negative multiplier. For this example it will be assumed that registers 10–12 each have a length of ten binary cells including a sign cell representing the mantissa. The exponents of the operands will be a four bit signed (with sign) binary number residing in registers 26 and 24.

Accumulator 10 has been preset to the state in which all cells are in a 0-state and the multiplier resides in register 12 and the multiplicand resides in register 11. Thus the contents of register 12 at any given time is illustrated in the drawings as (Q). The contents of accumulator 10 is illustrated as (A); and the contents of the operand register 11 is illustrated as (OR). In operation, timer 21 is initially set to the number of bits of the multiplier neglecting the sign bit which in the assumed condition is nine bits. On the multiply command, a high start signal is applied to an input of AND gate 200, FIG. 2, which produces a signal ADD EX. This signal is applied to exponent adder 28, FIG. 1. In addition the start signal is applied to the timing system 21 to set the down counter 152 to the multiplier count which in the assumed example will be a count of nine. Thus it will be understood that at time $t9$, the first cycle of multiplication, the register contents are as follows:

(1)    (A)   0.000000000  (Q) 1.1100111(00)
        (OR) 0.100000000

It will be noted that the bits within the parentheses represent the states of cells 12a (Q$n$) and 12b (Q$n-1$) connected to control circuit 15. At time $t9$, as a result of the states of cells 12a and 12b, the following signals are in a 1-state:

(2) ONE*, TWC*, SUB*, ADD*, SHR 2

Control circuit 15 has called for a signal SHR 2 and the decrementing of down counter by two. In coincidence with the termination of pulse $t9$ the signal ADD EX causes the contents of registers 24 and 26 to be added by exponent adder 28 with the final result placed in register 26. The accumulator exponent register 26 now holds the sum of the two operand exponents.

Further at the termination of time $t9$, the contents of registers 10 and 12 are shifted right twice and the down counter decremented by two so that at time $t7$ the register configuration is:

(3)    (A)   0.000000000  (Q) 1.00)11001(11)
        (OR) 0.100000000

It will now be understood that the following signals are in a 1-state:

(4)  ONE*, TWC*, Q$(n-1)$, Q$(n)$, SHR 2 SUB

In addition set gate 31 of flip-flop 30 is enabled. Circuit 15 is now calling for a subtract and shift right twice. The setting of the TWC flip-flop is a history of recognition of the first 1-state cell of the multiplier now in cell 12a. Further there is a decrement by two. In coincidence with the time $t7$, the subtraction of the contents of register A minus the contents of register OR (11) will be shifted two places to the right so that at time $t5$:

(5)    (A) 1.111000000  (Q) 1.0000)110(01)
        (OR) 0.100000000

The signals now in a 1-state are Q$(n-1)$*, Q$(n)$,

TWC, ONE*, SHR 1, SUB*, ADD*. Thus a shift right once and a decrementing of the down counter by one is being called for. In coincidence with the end of time $t5$, the contents of registers 10 and 12 are shifted one position to the right so that at time $t4$:

(6)  (A) 1.111100000   (Q) 1.00000)11(00)
     (OR) 0.100000000

The signals now in a 1-state are $Q(n-1)^*$, $Q(n)^*$, TWC, ONE*, ADD, SHR 2. In addition gate 35 is enabled to set the ONE flip-flop 38. In addition the timing system is decremented by two. In coincidence with the termination of time $t4$, the contents of register A (10) is added to register 11 and shifted right twice and the ONE flip-flop is set. Thus at time $t2$:

(7)  (A) 0.000111000   (Q) 1.0000000)11

At this time the signals in a 1-state are:

(8)  $Q(n-1)$, $Q(n)$, ONE, TWC, SUB, SHR 2

In this manner a subtract and a shift right twice are called for and a timing system decremented by two. In coincidence with the end of time $t2$, the registers contain:

(9)  (A) 1.111001110   (Q) 1.00000000

Since the down counter of system 21 is now at zero, this signifies completion of the multiplication. The data in register 10 is the most significant half of the product and the data in register 12 is the least significant half of the product. In order to prove that the answer in expression (9) is correct, the following steps may be taken:

(10) TWO'S COMPLEMENT OF PRODUCT—
     $(000110010/000000000) = -(2^{-4}+2^{-5}+2^{-8})$

(11) MULTIPLICAND $0.100000000 = +2^{-1}$

(12) TWO'S COMPLEMENT OF MULTIPLIER—
     $(001100100) = -(2^{-3}+2^{-4}+2^{-7})$

(13) (Expressions 11 x 12) $=(2^{-1})(2^{-3}+2^{-4}+2^{-7})=$
     $-(2^{-4}+2^{-5}+2^{-8})$

(14) (Expression 13) = (Expression 10)

Thus, in accordance with the invention there is provided a multiplication system in which the decisions of control circuit 15 are modified to correct for the singularities of negative multipliers as summarized in Tables 1–4, FIG. 9, and further defined in FIG. 10.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A floating point two bit look-ahead binary multiplication system using two's complement notation for representing negative numbers, comprising
an accumulator register, a Q register and an operand register each having the same number of binary cells and each including a binary cell corresponding to a sign bit, the multiplier residing in the Q register and the multiplicand residing in the operand register, cell $n$ being the least significant cell of said Q register and cell $n-1$ being the next most significant cell of said Q register,
an exponent accumulator and an exponent operand register each having the same number of binary cells and each including a binary cell corresponding to a sign bit, the exponent of the multiplier residing in the exponent accumulator register and the exponent of the multiplicand residing in the exponent operand register, an exponent summer having inputs connected to each cell of said exponent accumulator register and exponent operand register and, means connected to said exponent summer for applying the resultant to the exponent accumulator register,
a summer having inputs connected to each cell of said accumulator register and operand register and operable for summing in parallel the binary information in said accumulator and operand register and, means connected to said summer for applying the resultant to said accumulator register and to the two most significant cells of said Q register,
a two's complement binary cell connected to said sign cell and said cell $n$ of said Q register whereby said complement cell is set to its 1-state when both said sign cell and said cell $n$ are in a 1-state,
a "one" binary cell connected to said sign cell, cell $n$, cell $n-1$ of said Q register and said complement cell whereby,
    (1) said one cell is set to a 1-state when
        (a) said sign cell and cell $n$ are in a 1-state and cell $n-1$ and complement cell are in a 0-state, or
        (b) said complement cell is in a 1-state and said cell $n$ and cell $n-1$ are in a 0-state,
    (2) said one cell is reset to a 0-state when said cell $n$, cell $n-1$ and complement cell are in a 1-state,
add gate means having inputs connected to said sign cell of said Q register, cell $n-1$, cell $n$, one cell and complement cell and having outputs connected to each of the cells of said accumulator register, the two most significant cells of said Q register and to said summer for adding the binary information in said accumulator register and operand register when
    (1) said cells $n$ and $n-1$ and one cell are in a 0-state and said complement cell and said sign cell are in a 1-state, or
    (2) said cell $n-1$, one cell and complement cell are in a 0-state and cell $n$ is in a 1-state, or
    (3) said cell $n$, one cell, complement cell and sign cell are in a 1-state and cell $n-1$ is in a 0-state.

2. The multiplication system of claim 1 in which there is provided subtract gate means having inputs connected to said sign cell of said Q register, cell $n-1$, cell $n$, one cell and complement cell and having outputs connected to each of the cells of said accumulator register and the two most significant cells of said Q register and of said summer for subtracting the binary information in said accumulator and operand registers when
    (1) cell $n-1$ said complement cell and said sign cell are in a 1-state and cell $n$ and one cell are in a 0-state, or
    (2) cell $n$ and $n-1$ are in a 1-state and one cell and complement cell are in a 0-state, or
    (3) all of said cells are in a 1-state.

3. The multiplication system of claim 1 in which there is provided shift right twice gate means connected to each of the binary cells of said accumulator and said Q register for producing a signal to shift the information state of the accumulator register and of the Q register or the information state from the summer two bit positions to the right in the direction of least significance when
    (1) cells $n$ and $n-1$ are both in a 0-state or both in a 1-state, or
    (2) cell $n$ and said sign cell are in a 1-state and said cell $n-1$, complement cell and one cell are in a 0-state, or
    (3) cell $n-1$, said complement cell and said sign cell are in a 1-state and said cell $n$ and one cell are in a 0-state, or
    (4) cell $n$, said one cell, said complement cell and said sign cell are all in a 1-state and cell $n-1$ is in a 0-state.

4. The multiplication system of claim 1 in which there is provided shift right once gate means connected to each of the binary cells of said accumulator and said Q register for producing a signal to shift the information state of the accumulator and Q register or the information state of the summer one bit position to the right in the direction of least significance when (1) cell $n$, said complement cell and said sign cell are in a 1-state and cell $n-1$ and one cell are in a 0-state, or
(2) cell $n$, one cell and complement cell are in a 0-state and cell $n-1$ is in a 1-state, or
(3) cell $n-1$, one cell, complement cell and said sign cell are in a 1-state and cell $n$ is in a 0-state.

5. In a digital computer a floating point two bit look-ahead multiplication system using two's complement notation for representing negative numbers, comprising an accumulator, a Q register and an operand register each having the same number of binary cells and each including a binary cell corresponding to a sign bit, the multiplier residing in the Q register and the multiplicand residing in the operand register, cell $n$ being the least significant cell of said Q register and cell $n-1$ being the next most significant cell of said Q register, an exponent accumulator and an exponent operand register each having the same number of binary cells, an exponent summer having inputs connected to each cell of said exponent accumulator and exponent operand register and, means connected to said exponent summer for applying the resultant to the exponent accumulator, a summer having inputs connected to each cell of said accumulator and operand register and operable for summing in parallel the binary information in said accumulator and operand register and, means connected to said summer for applying the resultant to said accumulator register and to the two most significant cells of said Q register, a two's complement binary cell connected to said sign cell and said cell $n$ of said Q register whereby said complement cell is set to its 1-state when both said sign cell and said cell $n$ are in a 1-state, a "one" binary cell connected to said sign cell, cell $n$, cell $n-1$ of said Q register and said complement cell whereby,
  (1) said one cell is set to a 1-state when
    (a) said sign cell and cell $n$ are in a 1-state and cell $n-1$ and complement cell are in a 0-state, or
    (b) said complement cell is in a 1-state and said cell $n$ and cell $n-1$ are in a 0-state
  (2) said one cell is reset to a 0-state when said cell $n$, cell $n-1$ and complement cell are in a 1-state, and substract gate means having inputs connected to said sign cell of said Q register, cell $n-1$, cell $n$, one cell and complement cell and having outputs connected to each of the cells of said accumulator register and the two most significant cells of said Q register and of said summer for subtracting the binary information in said accumulator and operand register.

6. The multiplication system of claim 5 in which there is provided a plurality of shift right twice gates connected to each of the binary cells of said accumulator and said Q register and to said one and complement cells for producing a signal to shift the information state of the accumulator and of the Q register or the information state from the summer two bit positions to the right in the direction of least significance when
  (1) cells $n$ and $n-1$ are both in a 0-state or both in a 1-state, or
  (2) cell $n$ and said sign cell are in a 1-state and said cell $n-1$, complement cell and one cell are in a 0-state, or
  (3) cell $n-1$, said complement cell and said sign cell are in 1-state and said cell $n$ and one cell are in a 0-state, or
  (4) cell $n$, said one cell, said complement cell and said sign cell are all in a 1-state and cell $n-1$ is in a 0-state.

7. The multiplication system of claim 5 in which there is provided a plurality shift right once AND gates connected to each of the binary cells of said accumulator and said Q register for producing a signal to shift the information state of the accumulator and Q register or the information state of the summer one bit position to the right in the direction of least significance.

8. The multiplication system of claim 7 in which there is provided add gate means having inputs connected to said sign cell of said Q register, cell $n-1$, cell $n$, one cell and complement cell and having outputs connected to each of the cells of said accumulator register, the two most significant cells of said Q register and to said summer for adding the binary information in said accumulator register and operand register.

9. The multiplication system of claim 7 in which there is provided shift right twice gate means connected to each of the binary cells of said accumulator and said Q register and to said one and complement cells for producing a signal to shift the information state of the accumulator register and of the Q register or the information state from the summer two bit positions to the right in the direction of least significance.

10. The multiplication system of claim 9 in which there is provided a plurality of add gates having inputs connected to said sign cell of said Q register, cell $n-1$, cell $n$, one cell and complement cell and having outputs connected to each of the cells of said accumulator register, the two most significant cells of said Q register and to said summer for adding the binary information in said accumulator register and operand register when
  (1) said cells $n$ and $n-1$ and one cell are in a 0-state and said complement cell and said sign cell are in a a 1-state, or
  (2) said cell $n-1$, one cell and complement cell are in a 0-state and cell $n$ is in a 1-state, or
  (3) said cell $n$, one cell complement cell and sign cell are in a 1-state and cell $n-1$ is in a 0-state.

11. A binary multiplication system using two's complement notation for representing negative numbers, comprising an accumulator, a Q register and an operand register each having the same number of binary cells and each including a binary cell corresponding to a sign bit the multiplier residing in the Q register and the multiplicand residing in the operand register cell $n$ being the least significant cell of said Q register and cell $n-1$ being the next most significant cell of said Q register, an exponent accumulator and an exponent operand register each having the same number of binary cells and each including a binary cell corresponding to a sign bit, a summer having inputs connected to each cell of said accumulator register and operand register and operable for summing in parallel the binary information in said accumulator and operand register and, means connected to said summer for applying the resultant to said accumulator and to the two most significant cells of said Q register, a two's complement binary cell connected to said sign cell and said cell $n$ of said Q register whereby said complement cell is set to its 1-state when both said sign cell and said cell $n$ are in a 1-state, a "one" binary cell connected to said sign cell, cell $n$, cell $n-1$ of said Q register and said complement cell whereby,
  (1) said one cell is set to a 1-state when
    (a) said sign cell and cell $n$ are in a 1-state and cell $n-1$ and complement cell are in a 0-state, or
    (b) said complement cell is in a 1-state and said cell $n$ and cell $n-1$ are in a 0-state
  (2) said one cell is reset to a 0-state when said cell $n$, cell $n-1$ and complement cell are in a 1-state, and shift right once gate means connected to each of the binary cells of said accumulator and said Q register for producing a signal to shift the information state of the accumulator and Q register or the information state of the summer one bit position to the right in the direction of least significance when
- (1) cell $n$, said complement cell and said signal cell are in a 1-state and cell $n-1$ and one cell are in a 0-state, or
- (2) cell $n$, one cell and complement cell are in a 0-state and cell $n-1$ is in a 1-state, or
- (3) cell $n-1$, one cell, complement cell and said signal cell are in a 1-state and cell $n$ is in a 0-state.

12. The multiplication system of claim 11 in which there is provided a plurality of shift right twice gates connected to each of the binary cells of said accumulator and said Q register and to said one and complement cells for producing a signal to shift the information state of the accumulator and of the Q register of the information state from the summer two bit position to the right in the direction of least significance when
- (1) cells $n$ and $n-1$ are both in a 0-state or both in a 1-state, or
- (2) cell $n$ and said sign cell are in a 1-state and said cell $n-1$, complement cell and one cell are in a 0-state, or
- (3) cell $n-1$, said complement cell and said sign cell are in 1-state and said cell $n$ and one cell are in a 0-state, or
- (4) cell $n$, said one cell, said complement cell and said sign cell are all in a 1-state and cell $n-1$ is in a 0-state.

References Cited

UNITED STATES PATENTS

| | | | |
|---|---|---|---|
| 3,159,739 | 12/1964 | Deerfield | 235—164 |
| 3,116,411 | 12/1963 | Keir | 235—164 |
| 3,192,363 | 6/1965 | MacSorley | 235—164 |
| 3,193,669 | 7/1965 | Voltin | 235—164 |
| 3,069,085 | 12/1962 | Coopper et al. | 235—164 |
| 3,304,417 | 2/1967 | Hertz | 235—164 |

MALCOLM A. MORRISON, Primary Examiner

D. H. MALZAHN, Assistant Examiner